United States Patent [19]

Edmission

[11] Patent Number: 4,754,816
[45] Date of Patent: Jul. 5, 1988

[54] OVERCAP POINT FOR TILLAGE TOOL

[75] Inventor: Delmar D. Edmission, Guymon, Okla.

[73] Assignee: Adams Hard-Facing Company, Inc., Guymon, Okla.

[21] Appl. No.: 862,290

[22] Filed: May 12, 1986

Related U.S. Application Data

[63] Continuation-in-part of Ser. No. 706,128, Feb. 27, 1985, Pat. No. 4,625,810.

[51] Int. Cl.⁴ .............................................. A01B 23/02
[52] U.S. Cl. .................................... 172/749; 172/747; 172/753
[58] Field of Search ............... 172/772, 773, 749, 747, 172/753, 707, 708, 726, 699, 719, 703, 704, 702, 772, 732, 745, 730, 722, 724; 37/141 R, 141 T

[56] References Cited

U.S. PATENT DOCUMENTS

| 750,385 | 1/1904 | Naidul | 172/753 |
| 879,487 | 2/1908 | McWane | 172/753 |
| 989,729 | 4/1911 | Swindle | 172/750 |
| 1,872,072 | 8/1932 | Chibnik | 172/719 |
| 3,082,555 | 3/1963 | Hill | 172/753 X |
| 3,618,675 | 11/1971 | Hornung | 172/707 |
| 4,269,274 | 5/1981 | Robertson | 172/699 |
| 4,363,364 | 12/1982 | Wetmore | 172/772 |
| 4,625,810 | 12/1986 | Edmisson | 172/749 |

Primary Examiner—Richard J. Johnson
Attorney, Agent, or Firm—Laney, Dougherty, Hessin & Beavers

[57] ABSTRACT

A tillage tool which includes an elongated shank having a bifurcated forward end. A protective overcap point is secured to the bifurcated forward end of the shank by means of a trapezoidally cross-sectioned key which interlocks in the bifurcation slot. The overcap point further includes a pair of laterally opposed, downwardly extending side skirt portions which extend adjacent the side edges of the bifurcated leading end of the shank. A centrally located rib projects from the front of the overcap to adjacent the rear side thereof on the upper side of the overcap, and is of increasing width from its forward end to its rearward end, so that its divergent, opposed sides function to deflect dirt away from the center line of the shank portion.

12 Claims, 2 Drawing Sheets

OVERCAP POINT FOR TILLAGE TOOL

RELATED APPLICATIONS

This application is a continuation-in-part of my U.S. application Ser. No. 706,128 entitled "TILLAGE TOOL" filed on Feb. 27, 1985, now U.S. Pat. No. 4,625,810, and assigned to the assignee of the present invention.

BACKGROUND OF THE INVENTION

1. Field of the Invention

This invention relates to agricultural tillage tools, and more particularly to plow chisels which carry a leading point at the forward, lower end of an elongated shank, and are used in cultivating the soil.

2. Brief Description of the Prior Art

For the purpose of protecting the earth-penetrating portions of various types of tillage tools from abrasive wear, thereby extending the effective service life of such tools, several techniques have been used to afford such protection. In one of these an overcap point or protective plate has been mounted upon the lower, leading end of the tillage tool, so that the portion of the tool which first contacts the soil in a breaking action is protected against abrasion by the use of such an overcap or tip located in a protective position. Such overcaps or tips secured to the forward end of the shank of the tool have heretofore, in many instances, been made of a hard metal, such as tungsten or chromium carbide, and such overcaps or protective elements have been secured to the tillage tool shank either by welding or by a mechanical interlock.

Examples of prior art tillage tools which have been made up in this way are those which are illustrated and described in U.S. Pat. Nos. 4,363,354 to Wetmore; 1,095,404 to Koepke; 4,408,667 to Jarvis; 4,529,042 to Wetmore; 4,457,381 to Wetmore; 4,269,274 to Robertson et al; 3,082,555 to Hill; 750,385 to Naidul and 989,729 to Swindle.

In U.S. patent application Ser. No. 706,128 entitled "TILLAGE TOOL", of which the present application is a continuation-in-part, I have described a protective point or insert which is utilized to protect the leading end of a tillage tool shank, and which is engaged with the shank by means of a key which interfits in a dovetailed slot formed in the pointed forward end of the shank. The point can easily be intentionally removed if desired, but is not inadvertently displaced or knocked off the forward end of the shank during utilization by reason of the automatic and continuous seating action achieved by the interfit of the key with the dove-tailed slot or keyway.

BRIEF DESCRIPTION OF THE PRESENT INVENTION

The present invention comprises an improvement over the overcap point shown in my U.S. patent application Ser. No. 706,128 in that a tillage tool which I describe in the present application is characterized in having an overcap point which has specifically located soil-deflecting surfaces. The overcap point also has a rib of increasing thickness along the upper side thereof. This rib functions conjunctively with the key carried on the lower side of the overcap point to permit the overcap point to be more easily driven off of the end of the shank which carries it at times when such removal may be desirable. Other improvements also characterize the overcap point used in conjunction with the shank in the tillage tool of the present invention.

The present invention comprises a tillage tool adapted for carriage on an agricultural implement and includes an elongated shank adapted for bolting to the frog or frame element of the agricultural implement. The shank is arcuate in configuration, having a concave leading side and a convex trailing or rear side, as is conventional. At its forward lower end, the shank has its side edges developed in a convergent relationship, so that they extend toward a point at the forward, lowermost end of the shank. At this point, the shank is bifurcated so that an elongated, axially extending slot is defined. This slot is undercut and of diminishing width so that it can interlockingly engage a key element of an insert overcap point which is carried on the forward lower end of the shank.

The insert overcap point includes, in addition to the key element which is configured and dimensioned to engage the slot in the bifurcated forward, lower end of the shank, an overlying, axially extending ridge. This ridge flares in a transverse direction from front to rear so as to spread and deflect dirt and abrasive materials away from the shank which is located directly behind the rib. The overcap insert further includes certain symetrically located, sloping deflecting surfaces which also function to deflect the dirt away from the shank, and away from the remaining portions of the overcap insert.

The tillage tool constructed in accordance with the invention, as described, is characterized in having a long and trouble free operating life, and a very high resistence to abrasive wear.

An object of the invention is also to provide a tillage tool which has a hardened metal overcap point which can be mechanically interlocked on the forward end portion of the shank, but which can be detached for replacement with relatively simple tools, and in an expedient fashion, if this should become desirable or necessary.

Additional objects and advantages of the invention will become apparant as the following detailed description of a preferred embodiment of the invention is read in conjunction with the accompanying drawings which illustrated such preferred embodiment.

GENERAL DESCRIPTION OF THE DRAWINGS

DETAILED DESCRIPTION OF A PREFERRED EMBODIMENT OF THE INVENTION

Figure 1:
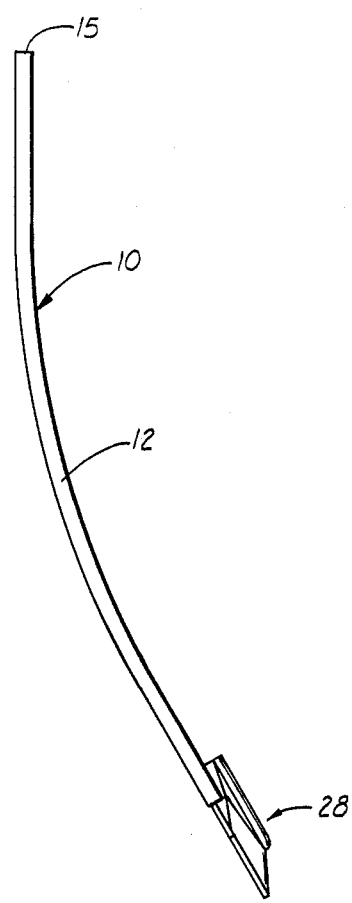
FIG. 1 is a side elevation view of the tillage tool of the invention.

Referring initially to FIG. 1 of the drawings, shown therein is a tillage tool constructed in accordance with the present invention and including a shank 10. The shank 10 can take various shapes and be variously dimensioned, but in a preferred embodiment includes an elongated, curved generally rectangular plate having opposed parallel side edges 12 and 14, and having an upper end 15. The shank also has an upper surface 16, and a lower surface 17.

Figure 3:
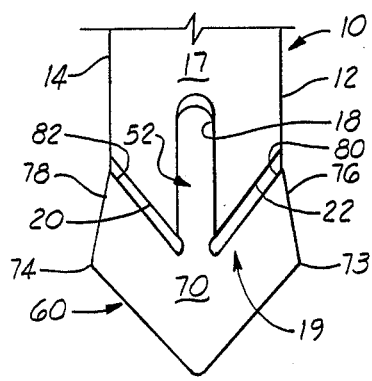
FIG. 3 is a bottom view of the forward, leading end of the tillage tool of the invention showing the bifurcated forward end of the shank, and further showing the manner in which the protective overcap is interfitted with the shank.

The lower forward end of the shank is bifurcated, as illustrated in FIG. 3, and thus defines an axially extending key-way or slot 18 which is of dimenishing transverse width from its open, forward lower end to its rear upper end. The slot 18 is formed inwardly in the shank from a pointed tip 19 defined by the convergence of a pair of inwardly angled edges 20 and 22 located at the forward lower end of the shank. Intermediate the length of the shank 10, a pair of bolt holes 24 and 26 are provided to facilitate bolting the shank to a frog (not shown).

Figure 4:
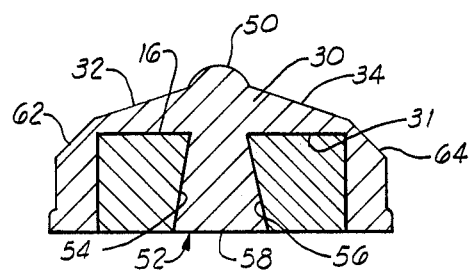
FIG. 4 is a sectional view taken along line 4—4 of FIG. 2.

A protective overcap point is mounted on the forward lower end of the shank, and is denominated generally by reference numeral 28. The overcap point 28 includes a principal overlying plate 30. The principal overlying plate 30 has a monoplaner lower surface 31 which extends substantially parallel to the contiguous upper surface 16 of the shank 10. The exposed upper side of the plate 30 includes a pair of outwardly and downwardly sloping side surfaces 32 and 34, as illustrated in FIG. 4. The surfaces 32 and 34 also slope downwardly in the direction of the forward end of the overcap point 28. The plate 30 thus has a greater thickness, as measured normal to the plane in which the upper surface 16 of the shank lies, at a location near the rear edge of the plate 30, than it does toward the forward, lower side of the plate. It can also be perceived in referring to FIGS. 2, 6 and 7 that the surfaces 32 and 34 are generally trapezoidally shaped in configuration, and collectively include a pair of opposed, converging side edges 38 and 40, a pair of converging rear edges 42 and 44, and a rear edge 46.

Figure 2:
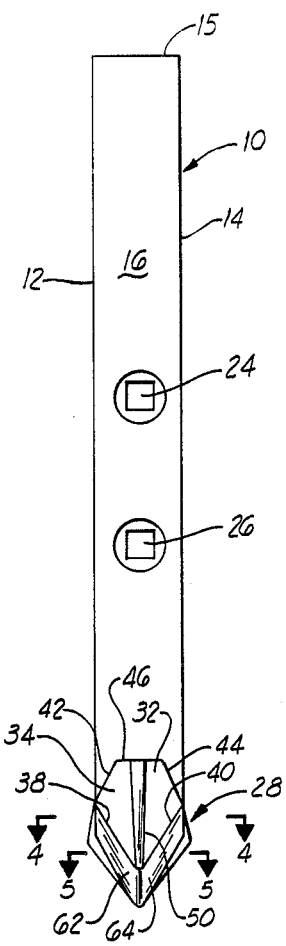
FIG. 2 is a front elevation view of the tillage tool of the invention.
Figure 5:
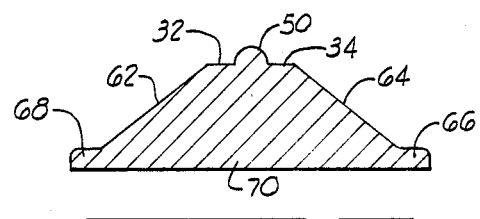
FIG. 5 is a sectional view taken along line 5—5 of FIG. 2.
Figure 6:
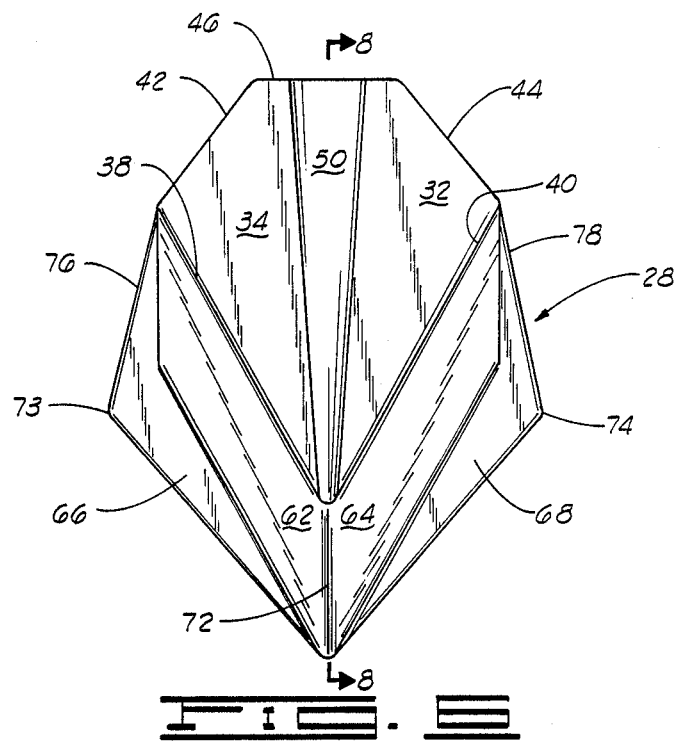
FIG. 6 is a plan view of the overcap point.
Figure 7:
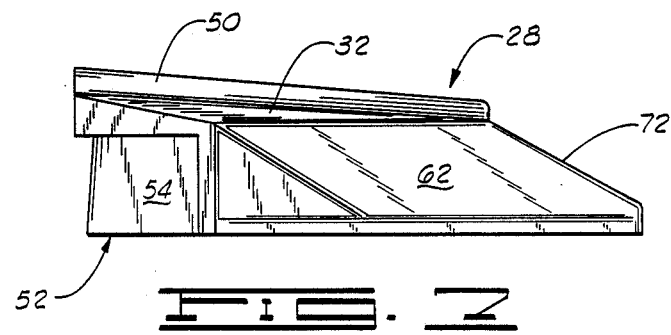
FIG. 7 is a side elevation view of the overcap point 28 forming a part of the tillage tool.
Figure 8:
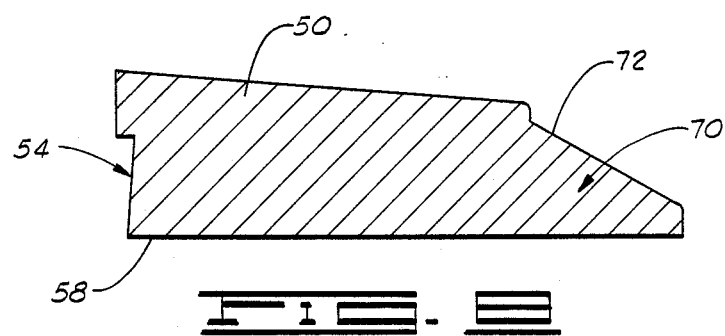
FIG. 8 is a sectional view taken along line 8—8 of FIG. 7.

Cast upon the plate 30 at a location which is centered with respect to the surfaces 32 and 34, and extending in a fore and aft direction on the plate 30, is a central reinforcing and deflecting protuberance or rib 50. It will be noted in FIG. 4 that the rib 50, which separates the surfaces 32 and 34, is substantially semi-circular in cross-sectional configuration. The rib 50 is characterized in having a substantially larger transverse dimension or width at its rear upper end, as best illustrated in FIGS. 2, 4 and 6 than at a location adjacent its forward end, as shown in FIG. 5. The purpose of this configuration, and of the sloping character of the surfaces 32 and 34, will be hereinafter alluded to in the discussion of the operation of the tillage tool.

Projecting downwardly from the under side of the overlying plate 30, and more specifically from the axial centerline of the lower surface 32 thereof, is an elongated key element designated generally by reference numeral 52. The elongated key element 52 is of trapezoidal cross-sectional configuration, and thus includes a pair of opposed sides 54 and 56 which converge in an upward direction toward the surface 31. The key element 52 is therefore narrower in thickness at its upper end (its root) as compared to its thickness at its lower end adjacent a flat bottom surface 58. It thus fits in, and mates with, the dove-tailed slot 18.

When the key element 52 is viewed in a longitudinal direction, it will be noted that it is of a narrower width or thickness adjacent its rear free end—its end nearer the rear end of the overlying plate 30—than it is at its forward end where the key joins an arrow-shaped forward portion of the overcap point 28, which arrow-shaped portion is designated generally by reference numeral 60. Thus, the key element 52, because of this diminishing thickness, is wedged into, and frictionally retained within, the axially extending slot 18.

The overcap point 28 further includes a pair of convergent, lateral deflection surfaces 62 and 64 which project downwardly and outwardly from the upper surfaces 32 and 34 in the manner best illustrated in FIGS. 2, 4, 5 and 6. The deflection surfaces 62 and 64 are, in a preferred embodiment of the invention, parallelograms in configuration. Each deflection surface is inclined so as to extend at an angle of between about 30° and about 60° to a vertical plane extended through either of its two longest parallel edges. Each of the deflection surfaces 62 and 64 terminates at its lower edge in the upper surface of a flange. Thus, the deflection surface 64 terminates in a flange 66, and the deflection surface 62 terminates in a flange 68. Flanges 66 and 68 form a part of the arrow-shaped forward portion 60 of the overcap point 28, and the lower surfaces of these two flanges lie in a common plane with the lower surface 70 of the arrow-shaped forward portion of the overcap point 28. The deflection surfaces 62 and 64 meet in a common forward boundary which defines a downwardly and forwardly sloping edge 72 which is longitudinally aligned with the deflecting protuberance or rib 50. The flanges 66 and 68 will be perceived in FIGS. 2, 3 and 6 to define a pair of lateral points 73 and 74 which are positioned at the lateral extremities of the overcap point 28. Extending from these points 73 and 74 on the flanges, the respective flanges 66 and 68 further include a pair of rearwardly and inwardly tapering side edges 76 and 78, respectively.

The arrow-shaped forward portion 60 of the overcap point 28 includes a pair of divergent wings which have respective rear edges 80 and 82. It will be noted, in referring to FIG. 3, that the rear edges 80 and 82 of the arrow-shaped forward portion 60 of the overcap point are spaced forwardly of the inwardly angled edges 20 and 22 at the forward, lower end of the shank 10 in the stage of the operating life of the tillage tool which is illustrated in the drawings. This is commensurate with the fact that wear on the protective overcap point has not yet developed to the point where the overcap point is seated so deeply in the slot 18 that the edges 20 and 22 abut the edges 80 and 82 of the arrow-shaped forward portion 60.

Operation

In the utilization of the tillage tool of the invention, the overcap point 28 affords protection for the shank 10 against the abrasive forces developed by utilization of the tool in sandy and abrasive soils. The overcap point 28 functions to effectively extend the service life of the tillage tool, and is preferably cast from a very hard metal, such as chromium carbide. The configuration of the overcap point 28 is such that it remains firmly in position on the forward lower end of the shank, and is not displaced therefrom by wear or abrasion, but only becomes more firmly seated as the use of the tool continues.

The deflecting protuberance or rib 50 which is located on the upper side of the principle plate 30, in undergoing an axial increase in thickness as shown, causes dirt which is encountered during use of the tool to be deflected to each side, so that the dirt wears minimally on the shank 10, and particularly adjacent the places where the shank is bolted to the frog. The deflection surfaces 62 and 64 perform a similar function in causing the dirt to be deflected outwardly away from the shank, and in fact, these surfaces also tend to protect the exposed upper surfaces 30 and 32 and the protuberant rib 50 from abrasive contact with the dirt. The flanges 66 and 68 aid in guiding the tillage tool into the soil, and cause it to move evenly through the soil. The entire configuration of the overcap point is particularly selected and purposely made in the configuration illustrated in order to afford the greatest strength and the most effective abrasion resistence to the tillage tool.

If, through some unusual occurrence, such as the striking of a very hard and large rock buried in the earth, the overcap point 28 becomes damaged, or perhaps becomes disengaged from the slot 18, it can be replaced quickly and easily. In some instances, too, it will be desirable to remove the overcap point 28, either for purposes of replacement due to a hair line fracture in the hardened metal, or due to undesirable localized abrasive wear, which is undesirable. Another occasion for removal of the overcap point 28 occurs when the shank 10 carries identical opposite ends—that is, it has a bifurcated pointed end at its upper end as well as at its lower end. This configuration makes the shank 10 reversible so that it can be turned around and the ends of the shank used interchangeably, as may be needed for extended wear and the like. On occasions of this type, it may be desirable to remove the overcap point 28 from one end of the shank and drive it into the operative engaged position on the opposite end.

Although a preferred embodiment of the invention has been herein illustrated in order to explain the geometry of the tillage tool, and the way the tool operates and functions, it will be understood that some changes can be made in the described and illustrated tool, and particularly in the shank 10, and to a lesser extent, in the overcap point 28, without departure from the basic principles which underlie the invention. Changes and innovations of this type, which continue to rely on these principles, are therefor deemed to be circumscribed by the spirit and scope of the invention, except as the same may be necessarily limited by the appended claims or reasonable equivalents thereof.

What is claimed is:

1. A tillage tool comprising:
    an elongated shank having a rear, upper end and having a bifurcated leading forward end portion defining a slot, and further having an upper surface and a lower surface, said slot extending from said upper surface to said lower surface thereof; and
    an overcap point detachably connected to said elongated shank and having an upper side and an under side and secured to the bifurcated end portion of said shank, said overcap point further having a forward end, a rear side and a pair of lateral side edges, said overcap point including:
        a key on the under side thereof projecting into and wedgingly engaged by, said slot and having a forward end and a rear end;
        an axially extending protuberant rib centrally located on the upper side of said overcap point directly over said key and in vertical alignment therewith, and having a forward end and a rear end; and
        divergent earth deflecting surfaces on opposite sides of said overcap point projecting rearwardly from said overcap point from the forward end thereof, said divergent deflecting surfaces being positioned to deflect soil away from said shank, and said deflecting surfaces being inclined at an acute angle to the upper and lower surfaces of said elongated shank;
        a pair of upwardly facing surfaces lying on the opposite sides of said protuberant rib with each of said upwardly facing surfaces located between one of said deflecting surfaces and said protuberant rib; and
        a pair of horizontally extending flanges located on opposite lateral sides of said overcap point in coplanar alignment with each other, each one of said horizontally extending flanges being located immediately below one of said earth deflecting surfaces.

2. A tillage tool as described in claim 1 wherein said rib is of progressively increasing transverse width in a direction such that the narrowest part of the rib is nearest the forward end of the shank, and the widest part of the rib is farthest from the forward end of the shank.

3. A tillage tool as described in claim 1 wherein the slot defined by the forward end portion of said shank extends axially in the shank and is narrower at a closed end thereof disposed at the end of the slot farthest from the forward end of the shank than at its open forward end, and wherein said slot is of dove-tailed, cross-sectional configuration.

4. A tillage tool as described in claim 3 wherein said key includes a forward end and a rear end spaced forwardly from the closed end of said slot, said key being wedged into said slot by forcing it into said slot in an axial direction.

5. A tillage tool comprising:
    an elongated shank having a rear, upper end and having a bifurcated leading forward end portion defining a slot; and
    an overcap point having an upper side and an under side and secured to the bifurcated end portion of said shank, said overcap point further including:
        a forward end;
        a rear side;
        a pair of lateral side edges;
        a key on the under side thereof projecting into, and wedgingly engaged by, said slot in said elongated shank, with said key having a forward end and a rear end;
        an axially extending protuberant rib centrally located on the upper side of said overcap point directly over said key, and having a forward end and a rear end;
        a forward edge sloping downwardly and forwardly from the forward end of said rib; and
        a pair of deflecting surfaces located on the opposite sides of said overcap point configured and positioned to deflect soil away from said shank, said deflecting surfaces including:
        a pair of complementary substantially parallelogram-shaped earth deflecting surfaces each having one side thereof formed by said forward edge, and diverging from each other as they extend away from said forward edge, said earth deflecting surfaces each lying in a plane inclined at an angle of from about 30° to about 60° to a vertical plane extending through an edge of the respective deflecting surface.

6. A tillage tool as described in claim 5 wherein said overcap point further includes a pair of trapezoidally shaped upwardly facing surfaces, the two trapezoidally shaped surfaces lying on opposite sides of said protuberant rib, with each of them located between one of said parallelogram shaped earth deflecting surfaces and said protuberant rib.

7. A tillage tool as described in claim 5 wherein said rib is of progressively increasing transverse width in a direction such that the narrowest part of the rib is nearest the forward end of the shank, and the widest part of the rib is farthest from the forward end of the shank.

8. A tillage tool as described in claim 7 wherein said overcap point further includes a pair of flanges located on opposite lateral sides of said overcap point in coplanar alignment, one of said flanges being located immediately below each of said parallelogram-shaped earth deflecting surfaces.

9. A tillage tool comprising:
an elongated shank having a rear, upper end and having a bifurcated leading forward end portion defining a slot, said shank further having an upper surface on said forward end portion and a lower surface on said forward end portion and having said slot extending from said upper surface to said lower surface of said forward end portion; and
an overcap point having an upper side and a lower side and secured to the bifurcated end portion of said shank, said overcap point further having a forward end, a rear side and a pair of lateral side edges, said overcap point including:
a key on a portion of the under side thereof, projecting into, and wedgingly engaged by, said slot and having a forward end and a rear end, said key further having a lower surface which is in coplanar alignment with the remaining part of said lower side of said overcap point other than that part upon which said key is located;
an axially extending protuberant rib centrally located on the upper side of said overcap point directly over said key, and having a forward end and a rear end; and
deflecting surfaces on opposite sides of said overcap point configured and positioned to deflect soil away from said shank.

10. A tillage tool comprising:
an elongated shank having a rear, upper end and having a bifurcated leading forward end portion defining a slot, and said elongated shank further having, at the forward end portion thereof, an upper surface and a lower surface; and
an overcap point having an upper side and an under side and secured to the bifurcated end portion of said shank, said overcap point further having a forward end, a rear side and a pair of lateral side edges, said overcap point including:
a key on the under side thereof projecting into, and wedgingly engaged by, said slot and having a forward end and a rear end;
an axially extending protuberant rib centrally located on the upper side of said overcap point directly over said key, and having a forward end and a rear end;
parallelogram-shaped earth deflecting surfaces on said overcap point and diverging from each other from a point of intersection at the forward end of said overcap point, each of said deflecting surfaces lying in a plane inclined at an acute angle to a vertical plane extending through an edge of the respective deflecting surface; and
a pair of flanges located on opposite, lateral sides of said overcap point in coplanar alignment with each other, one of said flanges being located immediately below one of said parallelogram-shaped earth deflecting surfaces.

11. A tillage tool comprising:
an elongated shank having a rear, upper end and having a bifurcated leading forward end portion defining a slot, said forward end portion further having an upper surface and a lower surface, and having said slot extending between said upper surface and lower surface and opening at the forward end of said elongated shank; and
an overcap point detachably connected to said elongated shank and having an upper side and an under side, said overcap point being secured to the bifurcated end portion of said shank by frictional engagement, said overcap point further having a forward end, a rear side and a pair of lateral side edges, said overcap point including:
a key on the under side of said overcap point projecting into, and wedgingly engaged by, said slot in the forward end portion of said elongated shank, and said key having a forward end and a rear end; and
an axially extending protuberant rib centrally located on the upper side of said overcap point directly over said key, and having a forward end in close proximity to the forward end of said overcap point, and also having a rear end, said rib progressively increasing in transverse width in a direction such that the narrowest part of the rib is nearest the forward end of the shank and nearest the forward end of the overcap point, and the widest part of the rib is farthest from the forward end of the shank and the forward end of the overcap point, said rib thereby having a wider portion of the rib located over said key on the under side of the overcap point than that portion of the rib which is closest to the forward end of the over cap point and is therefore forward of said key.

12. A tillage tool comprising:
an elongated shank having a rear, upper end and having a bifurcated leading forward end portion defining a slot, said forward end portion further having an upper surface and a lower surface with said defined slot extending through the forward end portion from the upper surface to the lower surface thereof; and
an overcap point having an upper side and an under side and detachably secured by frictional engagement with the bifurcated end portion of said shank, said overcap point further having a forward end, a rear end and a pair of lateral side edges, said overcap point including:
a key on the under side thereof projecting into, and wedgingly engaged by, said slot to frictionally retain said overcap point on said elongated shank, said key further having a forward end and a rear end;

an axially extending protuberant rib centrally located on the upper side of said overcap point over said key, and having a forward end and a rear end;

divergent deflecting surfaces on opposite sides of said overcap point projecting rearwardly on said overcap point from the forward end thereof, said deflecting surfaces being positioned to deflect soil away from said shank, and said deflecting surfaces being inclined at an acute angle to the upper and lower surfaces of said elongated shank;

a pair of trapezoidally-shaped, upwardly facing surfaces lying on the opposite sides of said protuberant rib with each of said trapezoidally-shaped surfaces located between one of said deflecting surfaces and said protuberant rib; and a pair of horizontally extending flanges located on opposite lateral sides of said overcap point in coplanar alignment with each other, each one of said flanges being located immediately below one of said earth deflecting surfaces.

* * * * *